US010380160B2

(12) United States Patent
Moreno Mengibar et al.

(10) Patent No.: US 10,380,160 B2
(45) Date of Patent: *Aug. 13, 2019

(54) DYNAMIC LANGUAGE MODEL

(71) Applicant: Google, LLC, Mountain View, CA (US)

(72) Inventors: Pedro J. Moreno Mengibar, Jersey City, NJ (US); Michael H. Cohen, Portola Valley, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,531

(22) Filed: Nov. 26, 2018

(65) Prior Publication Data

US 2019/0138539 A1    May 9, 2019

Related U.S. Application Data

(63) Continuation of application No. 15/231,066, filed on Aug. 8, 2016, now Pat. No. 10,140,362, which is a
(Continued)

(51) Int. Cl.
*G06K 9/00* (2006.01)
*G10L 25/00* (2013.01)
(Continued)

(52) U.S. Cl.
CPC .......... *G06F 16/338* (2019.01); *G06F 16/211* (2019.01); *G06F 16/29* (2019.01);
(Continued)

(58) Field of Classification Search
CPC ....... G10L 15/183; G10L 15/22; G10L 15/30; G10L 15/18; G10L 15/26
(Continued)

(56) References Cited

U.S. PATENT DOCUMENTS 8,630,860 B1 *   1/2014   Zhang .................... G10L 15/26
                                                         704/275

OTHER PUBLICATIONS

U.S. Appl. No. 15/231,066, filed Aug. 8, 2016.
(Continued)

*Primary Examiner* — Charlotte M Baker
(74) *Attorney, Agent, or Firm* — Fish & Richardson P.C.

(57) ABSTRACT

Methods, systems, and apparatus, including computer programs encoded on computer storage media, for speech recognition. One of the methods includes receiving a base language model for speech recognition including a first word sequence having a base probability value; receiving a voice search query associated with a query context; determining that a customized language model is to be used when the query context satisfies one or more criteria associated with the customized language model; obtaining the customized language model, the customized language model including the first word sequence having an adjusted probability value being the base probability value adjusted according to the query context; and converting the voice search query to a text search query based on one or more probabilities, each of the probabilities corresponding to a word sequence in a group of one or more word sequences, the group including the first word sequence having the adjusted probability value.

24 Claims, 6 Drawing Sheets

Related U.S. Application Data continuation of application No. 15/006,392, filed on Jan. 26, 2016, now Pat. No. 9,418,143, which is a continuation of application No. 14/719,178, filed on May 21, 2015, now Pat. No. 9,251,251, which is a continuation of application No. 13/802,414, filed on Mar. 13, 2013, now Pat. No. 9,043,205.

(60) Provisional application No. 61/662,889, filed on Jun. 21, 2012.

(51) Int. Cl.

| | |
|---|---|
| *G06F 16/338* | (2019.01) |
| *G06F 16/33* | (2019.01) |
| *G10L 15/00* | (2013.01) |
| *G06F 16/21* | (2019.01) |
| *G06F 16/29* | (2019.01) |
| *G10L 15/14* | (2006.01) |
| *G10L 15/197* | (2013.01) |
| *G10L 15/24* | (2013.01) |
| *G10L 15/26* | (2006.01) |
| *G10L 15/06* | (2013.01) |
| *G10L 15/22* | (2006.01) |
| *G10L 15/08* | (2006.01) |

(52) U.S. Cl.
CPC ...... *G06F 16/3344* (2019.01); *G06F 16/3346* (2019.01); *G10L 15/005* (2013.01); *G10L 15/14* (2013.01); *G10L 15/197* (2013.01); *G10L 15/24* (2013.01); *G10L 15/26* (2013.01); *G10L 15/265* (2013.01); *G10L 2015/0633* (2013.01); *G10L 2015/081* (2013.01); *G10L 2015/228* (2013.01)

(58) Field of Classification Search
USPC .......................................... 382/100; 704/275
See application file for complete search history.

(56) References Cited

OTHER PUBLICATIONS

U.S. Appl. No. 15/006,392, filed Jan. 26, 2016.
U.S. Appl. No. 14/719,178, filed May 21, 2015.
U.S. Appl. No. 13/802,414, filed Mar. 13, 2013.
EP Office Action issued in European Application No. 13732788.8-1207, dated Mar. 13, 2019, 5 pages.

\* cited by examiner

DYNAMIC LANGUAGE MODEL

CROSS-REFERENCE TO RELATED APPLICATIONS

This application is a continuation of and claims the benefit under 35 U.S.C. § 120 of U.S. patent application Ser. No. 15/231,066, for "Dynamic Language Model," which was filed on Aug. 8, 2016, now U.S. Pat. No. 10,140,362, which is a continuation of and claims the benefit under 35 U.S.C. § 120 of U.S. patent application Ser. No. 15/006,392, which was filed on Jan. 26, 2016, now U.S. Pat. No. 9,418,143, which is a continuation of and claims the benefit under 35 U.S.C. § 120 of U.S. patent application Ser. No. 14/719,178, which was filed on May 21, 2015, now U.S. Pat. No. 9,251,251, which is a continuation of and claims the benefit under 35 U.S.C. § 120 of the filing date of U.S. patent application Ser. No. 13/802,414, which was filed on Mar. 13, 2013, now U.S. Pat. No. 9,043,205, which claims the benefit under 35 U.S.C. § 119(e) of U.S. Patent Application No. 61/662,889, which was filed on Jun. 21, 2012. The foregoing applications are incorporated here by reference.

BACKGROUND

This specification relates to speech recognition.

Conventional voice search systems aim to convert a voice input from a user into a text search query. In a typical voice search system, a voice interface receives a user's voice input and provides the speech input to a speech recognition engine. The speech recognition engine can convert spoken words in the voice input to a text search query based on a language model. The voice search system then submits the text search query to a search engine. Thus, the voice search system allows a user to perform searches without typing the text search query.

SUMMARY

A voice search system applies a customized language model to convert a speech input to a text search query. The voice search system obtains a base language model that is constructed, for example, using a collection of anonymous search log data. The voice search system customizes the base language model based on one or more customization criteria, e.g., geographic location, time, or weather. In a customized language model, probability values assigned to one or more word sequences that are related to the customization criteria are adjusted.

When the voice search system receives a voice search query, the voice search system determines a context of the voice search query. The voice search system determines a customized language model when a component of the context satisfies a customization criterion. The voice search system then converts the voice search query into a text search query using the customized language model.

In general, one innovative aspect of the subject matter described in this specification can be embodied in methods that include the actions of receiving a base language model for speech recognition, the base language model including a first word sequence having a base probability value; receiving a voice search query, the voice search query being associated with a query context; determining that a customized language model is to be used when the query context satisfies one or more criteria associated with the customized language model; obtaining the customized language model, the customized language model including the first word sequence having an adjusted probability value, the adjusted probability value being the base probability value adjusted according to the query context; and converting the voice search query to a text search query based on one or more probabilities, each of the one or more probabilities corresponding to a word sequence in a group of one or more word sequences, the group of one or more word sequences including the first word sequence having the adjusted probability value. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Obtaining the customized language model includes selecting the customized language model from one or more customized language models based on the query context. Obtaining the customized language model includes adjusting the base language model based on the received query context using one or more language adjustment rules.

The query context includes a geographic location of a user device from which the voice search query is received. The method includes determining that the word sequence relates to the geographic location, wherein the adjusted probability value includes the base probability value adjusted based on a degree of relationship between the word sequence and the geographic location. The word sequence includes a name of a feature located at or proximate to the geographic location; and the degree of relationship is determined based on a distance between the feature and the geographic location in the query context. The word sequence includes a term of a past query received from the geographic location at a frequency that exceeds a threshold; and the degree of relationship is determined based on the frequency. The geographic location is a geographic area defined by one or more sets of latitude and longitude coordinates. The query context includes a user provided identifier for associating with the voice search query. The method includes determining a social group associated with the user provided identifier, the social group including one or more user identifiers that are related to the user provided identifier; determining a frequency of occurrence of the word sequence using stored query logs that are associated with the user identifiers in the social group; and adjusting the base probability value based on the frequency of occurrence. Adjusting the base probability value is further based on a degree of relationship in the social group between each of the user identifiers and the user provided identifier. The query context includes a timestamp of the voice search query. Obtaining the customized language model includes: identifying one or more electronic documents, the one or more electronic documents being associated with a number of search queries according to a query log, the number of search queries satisfying a threshold number, the search queries having occurred within a specified time window of the timestamp, each of the one or more electronic documents including the word sequence; and adjusting the base probability value based on the number of search queries. Each of the one or more electronic documents is a news article. The method includes providing for display on a display device, as a response to the voice search query, one or more search results of the text search query. Converting the voice search query to a text search query comprises converting the voice search query to a text search query that includes the first word sequence based on the corresponding adjusted probability value in the customized language model.

Particular embodiments of the subject matter described in this specification can be implemented so as to realize one or more of the following advantages. Compared to a conventional voice search system, a voice search system using a dynamic language model can provide more pertinent text search queries based on a received voice input. Since the system takes consideration of a particular circumstance of the voice input in a speech-to-text conversion, including, for example, a time of receiving the voice input, the location where the voice input is issued, and/or a user profile of a user providing the voice input, the resulting query can be customized according to the particular circumstance. Thus, the system can provide enhanced user experience.

The details of one or more embodiments of dynamic language modeling techniques are set forth in the accompanying drawings and the description below. Other features, objects, and advantages of the techniques will be apparent from the description and drawings, and from the claims.

BRIEF DESCRIPTION OF DRAWINGS

Like reference symbols in the various drawings indicate like elements.

DETAILED DESCRIPTION

Figure 1:
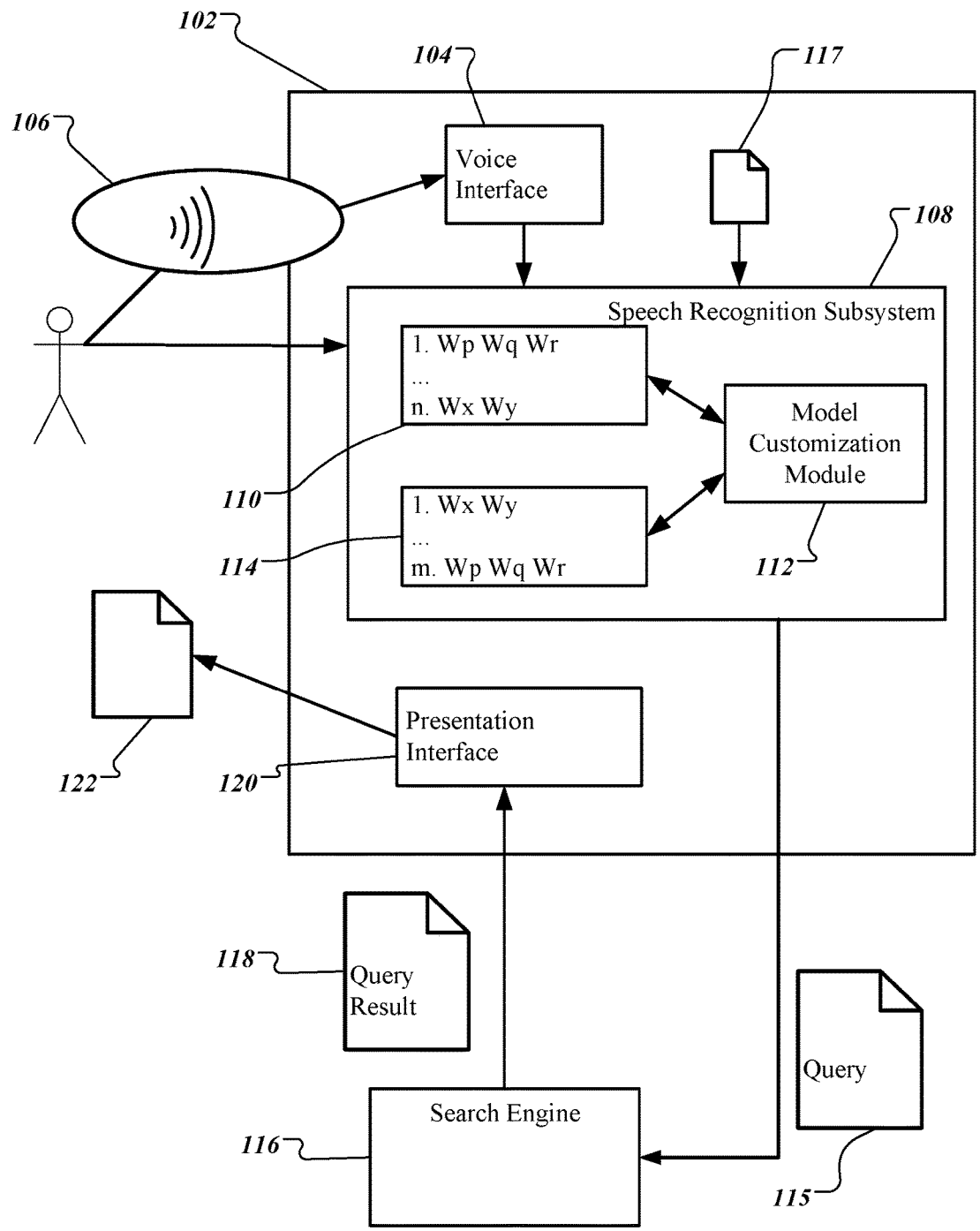
FIG. 1 is a block diagram providing an overview of an example system for providing voice searching.

FIG. 1 is a block diagram providing an overview of an example system for providing voice searching. A voice search system 102 includes one or more computers programmed to receive a user's speech input from a user, convert the speech input into a text search query using a dynamic language model, receive search results responsive to the text search query, and provide the search results to the user in response to the speech input. The voice search system 102 can be implemented, for example, on one or more computers including a server or on a user device.

The voice search system 102 includes a voice interface 104 configured to receive a speech input 106 from a user. The voice interface 104 can include, for example, an acoustic-to-electric transducer or sensor (e.g., a microphone) coupled to a user device. The speech input 106 can include a sequence of spoken words.

The voice search system 102 includes a speech recognition subsystem 108. The speech recognition subsystem 108 can be a software component of the voice search system 102 configured to convert the spoken words in the speech input 106 into a text search query 115. The speech recognition subsystem 108 includes a base language model 110. The base language model 110 can include probability values associated with sequences of words. In the base language model 110, a given word sequence, e.g., (Wa, Wb, ..., Wm) is associated with a probability value, e.g., P(Wa, Wb, ..., Wm), where each of Wa, Wb, ..., Wm includes a word, phrase, or sentence. The base language model 110 can include multiple word sequences and a probability value associated with each of the word sequences.

The base language model 110 can be an N-gram model (e.g., a unigram model or a multigram model). In the example shown, the base language model 110 is a bigram language model. The base language model includes a probability value P(Wx, Wy) associated with a word sequence (Wx, Wy). The probability value P(Wx, Wy) can be calculated using the following formula:

$$P(Wx, Wy) \approx P(Wx|<s>)P(Wy|Wx), \qquad (1)$$

where P(Wx, Wy) is a probability of the word sequence (Wx, Wy) appearing in a search query, <s> indicates a start of a search query, P(Wx|<s>) indicates a conditional probability that, given <s>, word Wx follows <s>, and P(Wy|Wx) indicates a conditional probability that, given word Wx, word Wy follows word Wx.

In addition, the base language model 110 can include a probability value P(Wp, Wq, Wr) that is associated with the word sequence (Wp, Wq, Wr). The probability value P(Wp, Wq, Wr) can be calculated, for example, in a bigram model using the following formula:

$$P(Wp, Wq, Wr) \approx P(Wp|<s>)P(Wq|Wp)P(Wr|Wq) \qquad (2)$$

The probability values P(Wx|<s>), P(Wy|Wx), P(Wp|<s>), P(Wq|Wp), and P(Wr|Wq) can be determined from stored queries received in the past.

For illustration, the word sequence (Wp, Wq, Wr) can represent a search query that is popular among the general public, e.g., a search query that appears more frequently compared to other search queries. The word sequence (Wx, Wy) can represent a search query that is popular only under special circumstances. For example, (Wx, Wy) can be a name of a specialty restaurant located in a geographic area, e.g., a town, ABC. The voice search system 102 is more likely to receive a search query having query terms (Wx, Wy) from users who are in geographic area ABC than from users who are out of the geographic area ABC.

In this example, geographic area ABC is not a particularly popular geographic area among many geographic areas from which queries are received. Thus, in the base language model, P(Wp, Wq, Wr) can be greater than P(Wx, Wy), indicating that, in general, the speech recognition subsystem 108 is more likely to convert the speech input 106 into a text search query (Wp, Wq, Wr) than into a text search query (Wx, Wy). According to a ranking of probability values, (Wp, Wq, Wr) can be ranked as first, while (Wx, Wy) can be ranked at some nth position after the first in the base language model 110.

The speech recognition subsystem 108 includes a model customization module 112. The model customization module 112 can be a software component of the speech recognition subsystem 108 configured to cause a computing device to adjust the base language model 110 dynamically based on one or more adjustment factors and to generate a customized language model 114. The adjustment factors are information items separate from the base language model 110 that can affect the likelihood that the speech input 106 is converted to a particular text search query. The model customization module 112 can determine the adjustment factors based on, for example, one or more of location, query timestamp, or other parameters.

For example, for a given speech input, the probability value P(Wx, Wy) can be lower than the probability value P(Wp, Wq, Wr) in the base language model 110. The model customization module 112 can increase the probability value P(Wx, Wy) such that the probability value P(Wx, Wy) in the customized language model 114 is higher than the probability value P(Wx, Wy) in the base language model 110, when one or more adjustment factors are taken into consideration, for example when a particular location condition is satisfied. The model customization module 112 can associate the customized language model 114 with a location (e.g., geographic region ABC). The model customization module 112 can dynamically adjust the base language model 110 to generate the customized language model 114 at query time such that the probability of one or more particular word sequences in the customized language model 114 is different from the probability of those same word sequences in the base language model 110.

The speech recognition subsystem 108 is configured to receive a query context 117 that is associated with the speech input 106. The query context 117 includes data that describe a circumstance under which the speech input 106 is generated. The query context 117 can include location information indicting where the speech input 106 is issued. For example, the location information can include a longitude and a latitude parameter, global positioning system coordinates, or an internet protocol (IP) address based on which a location can be estimated. The location information can be obtained from a user device.

The speech recognition subsystem 108 is configured to determine whether to use the base language model 110 or the customized language model 114 to convert the speech input 106 to a text search query 115. If, for example, the speech recognition subsystem 108 determines, based on the query context 117, that a user providing the speech input 106 is located in geographic region ABC, the speech recognition subsystem 108 can use the customized language model 114. However, if the speech recognition subsystem 108 determines, based on the query context 115, that a user providing the speech input 106 is not located in geographic region ABC, the speech recognition subsystem 108 can use the base language model 110 to convert the speech input 106 to the text search query 115.

Thus, if the speech recognition subsystem 108 determines that the user providing the speech input 106 is located in geographic region ABC, the speech recognition subsystem 108 applies the customized language model 114 in speech recognition, and generates a text string from the speech input 106. According to a ranking of probability values in the customized language model 114, everything else being equal, the speech input 106 is more likely to relate to (Wx, Wy) than to (Wp, Wq, Wr), because the increased probability value P(Wx, Wy) in the customized language model 114 is higher than the probability value P(Wp, Wq, Wr). Accordingly, the speech recognition subsystem 108 converts the speech input 106 into a text string including terms (Wx, Wy) or provides for display a list of options in which (Wx, Wy) is placed higher than (Wp, Wq, Wr), e.g., at or near the top of a query suggestion list, for a user to select a text search query.

If the speech recognition subsystem 108 determines that the user providing the speech input 106 is not located in a particular geographic region associated with a customized language model, the speech recognition subsystem 108 applies the base language model 110 in speech recognition, and generates a text string from the speech input 106, e.g., that includes the terms (Wp, Wq, Wr).

The voice search system 102 submits the text string generated by the speech recognition subsystem 108 as a text search query 115 to a search engine 116. The text search query 115 can include search terms "Wx Wy" based on the customized language model 114 or "Wp Wq Wr" based on the base language model 110. The search engine 116 can include a web search engine coupled to the voice search system 102. The voice search system 102 receives one or more query results 118 from the search engine 116, and provides the query results 118 for display on a presentation interface 120, which can be a component on a user device, e.g., a web browser, or can be a component of a server, e.g., a dynamic web page. The presentation interface 120 can include a display interface or a voice output interface. The presentation interface 120 can present to the user the one or more query results 118, e.g., a displayed query result page 122, which can include, for example, a result "Wx Wy Restaurant."

Figure 2:
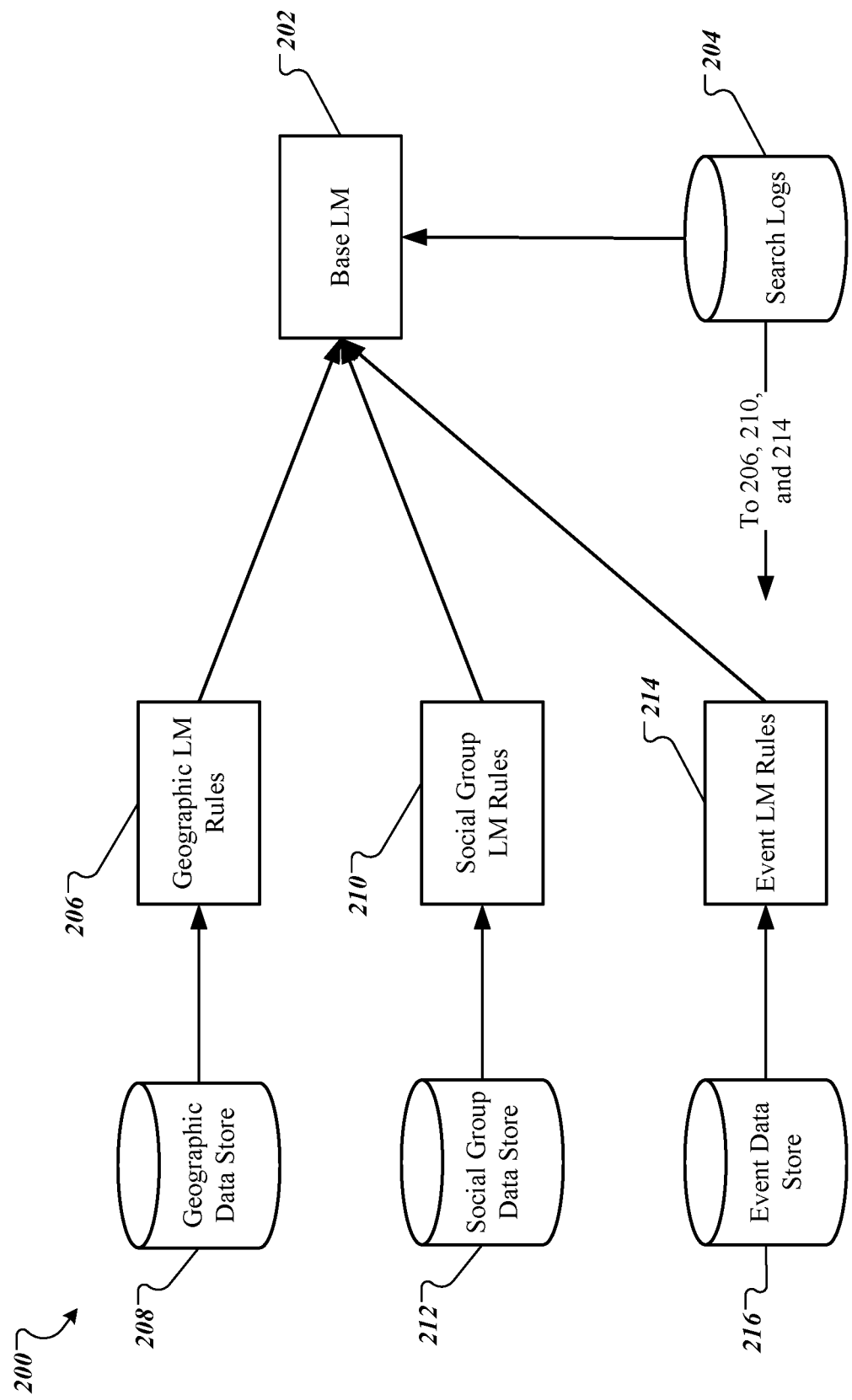
FIG. 2 is a block diagram illustrating example rules for generating a dynamic language model.

FIG. 2 is a block diagram 200 illustrating example rules for generating a customized language model, e.g., customized language model 114. A system implementing a dynamic language model obtains a base language model 202. The system can obtain the base language model 202 from another system. The system can alternatively build the base language model 202 from search logs 204 using publicly available language modeling technologies, e.g., RandLM or the CMU-Cambridge Statistical Language Modeling Toolkit. The system can obtain the search logs from a search engine that is in communication with the system or that is a part of the system. In some implementations, the system obtains a separate base language model 202 for each language supported by the system.

The system can customize the base language model 202 using geographic language model rules 206. The geographic language model rules 206 include adjustment factors for adjusting a probability value of a word sequence in the base language model 202 when the word sequence relates to a geographic feature in, or is received from, a specified geographic area. The word sequence can relate to the geographic feature by virtue of being, e.g., a name, an address, or a characteristic of the geographic feature.

The geographic feature can include any feature that relates to, or entity that is located at, the geographic area. For example, geographic features can include businesses, landmarks, local government offices, streets, parks, schools, or events commonly occur at a particular location. The geographic areas can include countries, states, counties, cities, business districts, or grids determined by latitudes and longitudes.

The geographic language model rules 206 can be grouped by geographic areas. For each geographic area, the system associates word sequences that relate to the geographic features in the geographic area with an adjustment factor. The adjustment factor can indicate a likelihood that, compared with other geographic areas, a search query from the specified geographic area is more likely to include a word sequence that relates to a geographic feature in a specified geographic area. The adjustment factor can include a multiplier that is applied to the probability value associated with the word sequence in the base language model 202.

For example, a geographic language model rule includes an adjustment factor for a word sequence (Wx, Wy), which, in this example, is a name of a business, located in geographic region ABC. The adjustment factor can include a multiplier that increases the probability value P(Wx, Wy) of the word sequence (Wx, Wy). The system applies the multiplier to the probability value P(Wx, Wy) in the base language model 202 to create a customized language model. The customized language model can be associated with geographic region ABC. The system uses the customized language model for speech recognition when the system determines that a user providing the speech input (e.g., a voice query) is located in geographic region ABC.

The system can generate the geographic language model rules 206 based on information from a geographic data store 208, search logs 204, or both. The geographic data store 208 stores names and locations of geographic features associated with each geographic area. The system can obtain the names and locations from a list of registered business names, publicly records, or user inputs. For example, an operator of a restaurant having name (Wx, Wy) in geographic region ABC can register the name (Wx, Wy) in association with geographic region ABC in a web "yellow page" or other database of public business listings in the geographic data store 208. Based on the database, the system can associate the name (Wx, Wy) with geographic region ABC. The names stored in the geographic data store 208 can be normalized (e.g., de-capitalized, spell corrected, or otherwise standardized) to map to a word sequence in the base language model 202.

The system can analyze search logs 204 to generate query frequency information that the system uses to determine a magnitude of an adjustment factor. The query frequency information can include a count on the number of times a particular query has been received by the system or by the search engine. The system can filter the query frequency information using a threshold. The system can use the threshold to determine whether to increase a probability value. Using information stored in the search logs 204, the system can determine a frequency of a voice or text search query that includes query terms (Wx, Wy) received from users at various locations. If the system determines that the frequency exceeds a threshold when the users are located at or near geographic region ABC, the system can specify a geographic language model rule having an adjustment factor that increases the value P(Wx Wy) in the base language model 202.

The system can additionally or alternatively customize the base language model 202 using social group language model rules 210. The social group language model rules 210 include adjustment factors for adjusting a probability value in the base language model 202 based on a user's social group. The probability value for a word sequence in the base language model 202 is adjusted for user A based on information submitted by users in the social group of user A. The information can include, for example, one or more stored queries of the users in the social group.

If the system receives a particular query from users among user A's social group at a frequency that exceeds a threshold, the system can adjust the probability value of a word sequence that corresponds to the query. For example, the system can determine that, based on queries from users within user A's social group, the system receives a threshold number of search queries including word sequence (Wa, Wb, Wc, Wd). In some implementations, queries have been anonymized in query logs such that the submitting user is obscured (e.g., by removing source identifying information from stored queries). Based on the determination, the system can adjust the base language model 202 to increase a probability value for the word sequence (Wa, Wb, Wc, Wd) for user A, as well as for users within the social group of user A. Thus, for users within the social group of user A, the system can increase the likelihood of recognizing a speech input as word sequence (Wa, Wb, Wc, Wd) rather than some other word sequence, e.g., (We, Wf, Wg, Wh), having a higher probability in the base language model 202.

The system can generate the social group language model rules 210 based on information obtained from a social group data store 212, search logs 204, or both. The social group data store 212 can store information that relates users and that each of the related users choose to submit to the system for customizing language models. The information can include a circle of connected users, which include one or more users identified as socially connected to the user. The information can be retrieved from a social site, a virtual group, a virtual chat room, a contact list, or any combination of the above. The search logs 204 stores query frequency information, which can include a count on the number of times a particular query has been received by the system and correspond to user identifiers in a user's social group.

The system can additionally or alternatively customize the base language model 202 using event language model rules 214. The event language model rules 214 include adjustment factors for adjusting a probability value in the base language model 202. When a word sequence is associated with a popular event, the probability value associated with the word sequence can be increased. The system generates the event language model rules 214 based on information stored in the event data store 216, or the search logs 204, or both. The specified events can include any event that can affect the probability that a speech input converts into a particular word sequence.

In some implementations, the system adjusts probability values based on time events. The system can generate the event language model rules 214 based on time of day or day of week. For example, the system can determine that in specified hours of a day (e.g., between noon and 1 pm, or between 6 pm and 8 pm), the system receives a number or percentage of queries that relate to restaurants, where the number or percentage exceeds a threshold. The system can increase the probability values of word sequence in the base language model 202 that relate to restaurants based on the number or percentage.

In some implementations, the system adjusts probability values based on weather events. The system can generate the event language model rules 214 based on weather information. The system can be configured such that under given weather conditions, a specified set of word sequences are given adjusted probability values. The event data store 216 can include information received from one or more weather services. When each of the weather services provides a weather forecast that a probability of rain exceeds a specified threshold, names of services relating to road condition reports, flood warning, or roof repair can be given higher weight.

In some implementations, the system uses popular news events. The system can generate a particular event language model rules 214 based on a popularity of subjects in one or more news reports. For example, the event data store 216 can store information from various news sources. When a word sequence appear in the news sources at a frequency that exceeds a threshold, the system can generate an event language model rule 214 that increases the probability value associated with the word sequence.

Figure 3:
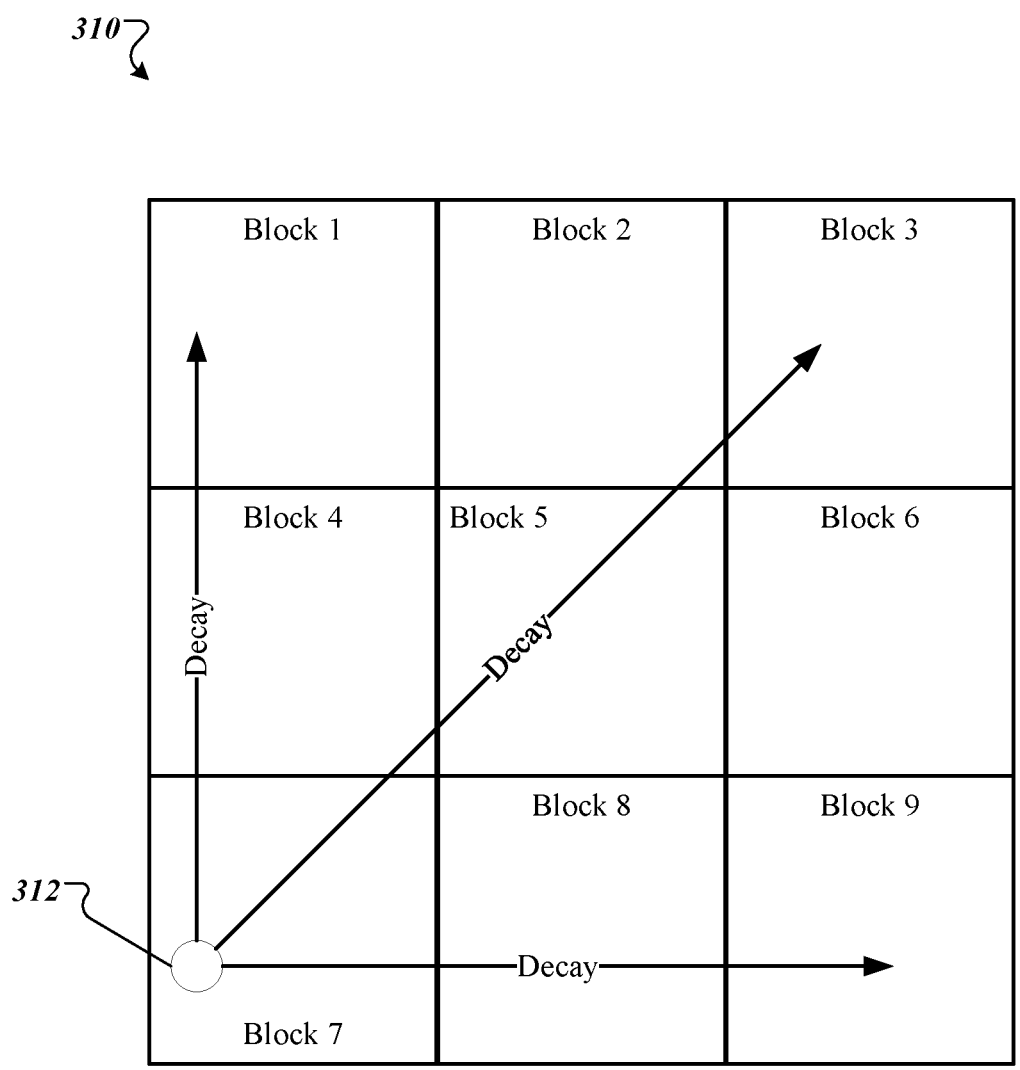
FIG. 3 is a diagram illustrating example geography-based rules of a dynamic language model.

FIG. 3 is a diagram illustrating example dynamic language models based on geographic information. In a system implementing a dynamic language model based on geographic information, the system annotates word sequences with the geographic information. At query time, the system uses the dynamic language model based on a geographic location of a user device from which a speech input is received.

The system includes a location interface configured to receive location information from the user device. In some implementations, the location interface can include various modules configured to receive latitude, longitude, or altitude information from a location-aware user device. In some implementations, the location interface can include various modules that are configured to determine a location of the user device based on an Internet protocol (IP) address of the user device, a wireless access point to which the user device is connected, or other information. The system can convert a same speech input to different text search queries when the user device is located at different geographic locations.

The system divides a geographic area into a collection of virtual blocks 310. Each block in the collection of virtual blocks 310 can correspond to a language model customized for the block. The blocks can be defined based on latitude and longitude coordinates of a center of each block or one or more vertices of each block. In some implementations, the blocks can be defined based on a corner of each block, and a block size. The block size can be defined in kilometers, miles, or degrees of latitude or longitude.

The system identifies an entity 312 located in Block 7 of the collection of virtual blocks 310. The entity 312 can be a feature that is permanently or quasi-permanently associated with Block 7. For example, the entity 312 can be a business located in block 7, the business having a business name (e.g., word sequence (Wx, Wy)) registered in the system or registered in a registry coupled to the system. The system can create a dynamic language model associated with Block 7. In this dynamic language model, the probability value P(Wx, Wy) of the word sequence associated with the entity is adjusted by a multiplier, such that the probability value is increased.

The system can create a customized language model for each block of the collection of virtual blocks 310. In each customized language model, the probability value of the word sequence associated with the entity 312 is adjusted by an amount that is determined based on a distance between Block 7 and the block to which the dynamic language model is associated. In particular, the amount can be discounted based on the distance. The distance can be, for example, a Euclidean distance, a Manhattan distance, or a distance measured by estimated travel time. For those blocks that are immediate neighbors of Block 7 (e.g., Blocks 4, 5, and 8), the corresponding dynamic language models can have a first adjustment amount for the probability value P(Wx, Wy). For those blocks that are distant neighbors of Block 7 (e.g., Blocks 1-3, 6, and 9), the corresponding dynamic language models can have a second adjustment amount for the probability value P(Wx, Wy), where the second adjustment amount is less than the first adjustment amount. For those blocks that are farther away from Block 7 (not shown), the probability value P(Wx, Wy) can remain unadjusted.

When the system receives a speech input from a user device, the system determines in which of the collection of virtual blocks 310 the user device is located. The system then applies the language model associated with the block to convert the speech input into a text search query.

Figure 4:
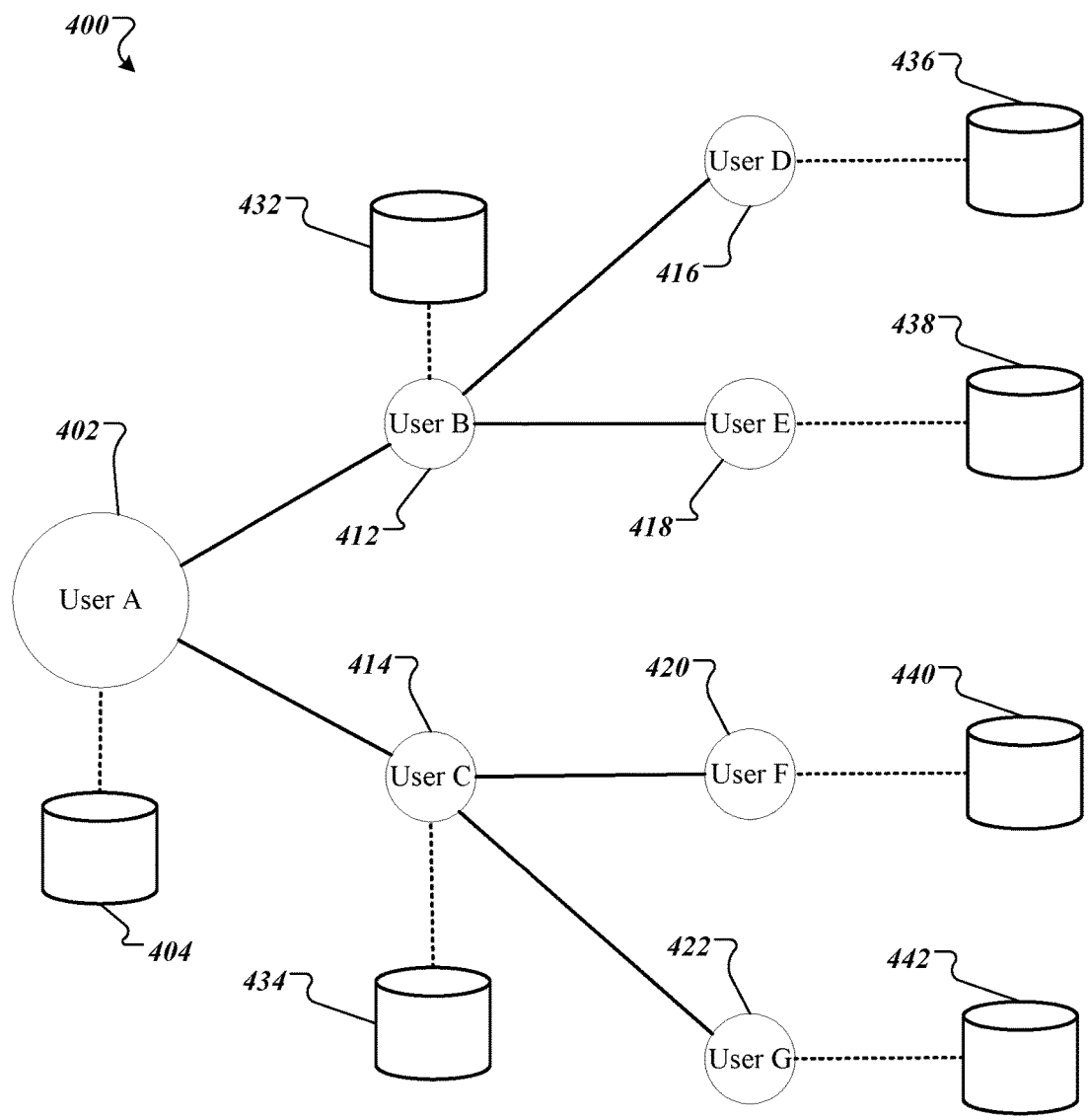
FIG. 4 is a diagram illustrating example social group based rules of a dynamic language model.

FIG. 4 is a diagram illustrating an example dynamic language model 400 based on a user's social group. For a given user, the system adjusts probability values of word sequence in a language model when the word sequence is used by users in the user's social group at a frequency that satisfies a threshold. The frequency can be an absolute frequency or a relative frequency.

The system can receive user data 402 of a registered user (user A) of a particular social site. User data 402 can include a user identifier for user A and user information submitted by user A after user A requests speech recognition improvement. The user information can include, for example, a user's home location, a user preference, and other information associated with the user.

The system generates language model adjustment rules 404 for user A based on the user data 402. The system can generate the language model adjustment rules 404 based on the location, preference, and other information. For example, if user A has submitted a query including a particular query term, and if user A has submitted that query for a specified number of times (e.g., once, or more than once), the system can create a rule in language model adjustment rules 404 that increases the probability of a word sequence including the query term.

The system can identify a social network of user A based on the user data 402 as provided or authorized by the user. The social network can include a user-specified social connection circle (e.g., a friend circle), a list of users based on user A's contact list, or a list of users based on common activities between the users and user A (e.g., chat room participation). The system can determine a degree of relationship between the users and user A. For example, the system can determine that user B and user C are directly related to user A and thus are related to user A at a first degree. The system can determine that users D, E, F, and G are related to user A through users B and C, and thus are related to user A at a second degree.

The system receives user data 412, 414, 416, 418, 420, and 422 from users in user A's social network (user B through user G), after these users request to improve speech recognition for themselves and users in their social connection circle. The system can create model adjustment rules 432, 434, 436, 438, 440, and 442 for user B through user G, respectively. The system can generate at least a portion of the language model adjustment rules 404 based on the user data 412-422, or the model adjustment rules 432-442, or both.

In some implementations, the system uses queries of a user's social connections to build a customized language model. For example, according to user data 412, user B has performed a search using a query containing certain query terms one or more times. The system increases a probability value of a word sequence including the query terms based on a frequency of user B's search and a degree of relationship between user B and user A.

In some implementations, the system uses information other than queries of a user's friends to build a customized language model. If, for example, user B and user C have discussed a restaurant having a name "Wx Wy" with or without user A's participation, or have searched using a query "Wx Wy," the system can increase the probability for the word sequence (Wx, Wy) in a customized language model for user A.

The application of user A's social network can be based on privacy settings of each user. For example, the system can use user B and user C's search to adjust the language model of user A if each of user B and user C gives permission to share search information among a circle of friends, or if each of user B and user C gives permission to use the user's information to tune language models of friends.

The system can determine the amount of adjustment based on the degree of relationship. A lower degree of relationship represents a closer relationship between two users and can indicate a higher likelihood that the two users have shared interests and search habits. Accordingly, the system decreases the amount of adjustment as the degree of relationship increases. For example, the system can increase the probability value for a word sequence for user A at a first amount if the increase is based on query performed by user B. The system than can increase the probability value for a word sequence for user A at a second amount if the increase is based on query performed by user D. The first amount can be greater than the second amount.

The system can customize a base language model using the identified language model adjustment rules 404 at query time, or store a customized language model before query time. When the system receives a speech input from user A, the system can identify the language model adjustment rules 404 for user A based on an identifier of user A, and customize a base language model using the language model adjustment rules 404. Alternatively or additionally, the system can perform speech recognition using a pre-stored custom language model that is specific to user A.

Figure 5A:
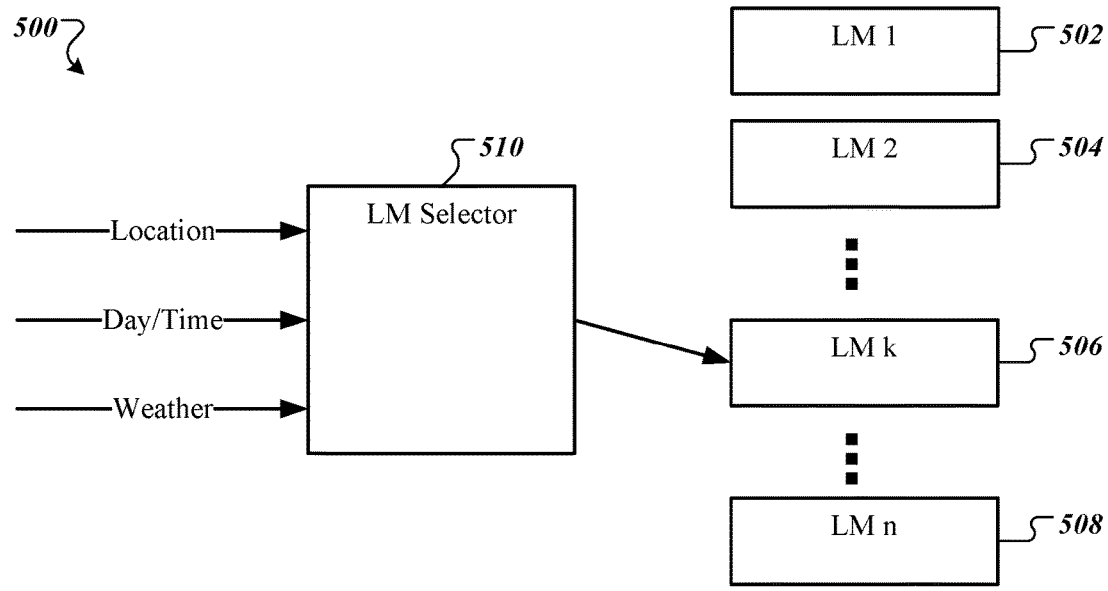
FIGS. 5A and 5B are block diagrams illustrating example implementations of dynamic language models.
Figure 5B:
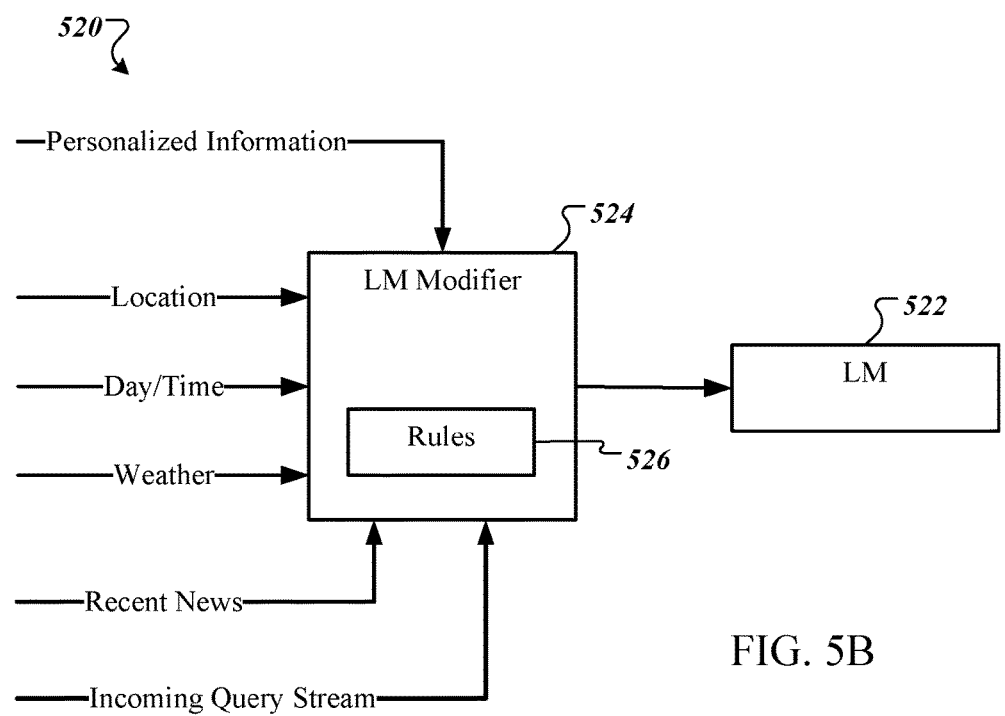

FIGS. 5A and 5B are block diagrams illustrating example implementations of dynamic language models. A system implementing dynamic language model techniques can adopt implementations described in reference to FIG. 5A, FIG. 5B, or a combination of both.

FIG. 5A is a block diagram 500 illustrating example implementations where the system creates customized language models 502, 504, 506, and 508 asynchronous with a voice query, e.g., at some time other than in response to a received query. Each of the customized language models 502, 504, 506, and 508 includes some or all of the word sequences in a base language model, and is associated with one or more criteria for applying the customized language model. The probability values associated with the respective word sequences in a customized language model are determined based on the application criteria. Each of the application criteria can specify a location, time, weather, or other factors (e.g., user segments defined by age, gender, income level, or buying habit of the general population). For example, the dynamic language model 506 is associated with application criteria specifying that the dynamic language model 506 applies at a specified location in a specified time window under a specified weather condition. The system can build or update the customized language models 502, 504, 506, and 508 periodically or upon a triggering event. The triggering event can include, for example, a new way of segmenting users has been implemented.

At query time, the system receives a speech input and obtains a context of the speech input. For example, the system can determine the user's location, time of the speech input, and retrieve weather information from a weather service based on the location and time. The system can identify a user segment that the user belongs to using a profile associated with a user identifier provided by the user when the user logs into the system. The system submits the context to a language model selector 510. The language model selector 510 is a component of the system configured to match the context of the speech input with the application criteria associated with the customized language models 502, 504, 506, or 508, and identify a dynamic language model based on the match.

For example, the system can receive a user location, a query time, and query time weather at the user location. The language model selector 510 can determine that the user location intersects the applicable location of the application criteria associated with the dynamic language model 506, the query time is within the applicable time window of the of the application criteria, and the query time weather at the user location matches the applicable weather of the application criteria. Accordingly, the language model selector 510 selects customized language model 506. The system then performs speech recognition to convert the user's speech input into a text search query using the customized language model 506. If, for example, the system receives the same speech input at a different location or at a different time, the system can apply a different language model (e.g., language model 504).

FIG. 5B is a block diagram 520 illustrating example implementations where the system dynamically adjusts a language model 522. The language model 522 can be a base language model or a customized language model.

The system includes a language model modifier 524. The language model modifier is a component of a user device or a server device configured to apply one or more rules 526 to adjust the language model 522. The language model modifier 524 receives inputs including personalized information, location information, date/time information, weather information, recent news/current affairs information, or query stream from one or more users. The language model modifier 524 applies the rules 526 to the language model 522 based on the input. After application of the rules 526, the language model 522 can become a customized language model.

For example, one of the rules 526 can specify that when a term appears in news reports within a specified period of time (e.g., last three days before the rules 526 are applied to the language model 522) and at a frequency that satisfies a threshold, the system increases the probability value of a word sequence including that term. Another rule can specify that a user can allow the system to analyze queries submitted by the user in the past and determine a search pattern to be associated with the user, if the user chooses to allow the system to collect the information.

In some implementations, the language model modifier 524 can adjust the language model 522 at query time. In some implementations, the language model modifier 524 can create a customized language model for a particular user or in response to a particular current event, and store the customized language model on a user device or a server device.

Figure 6:
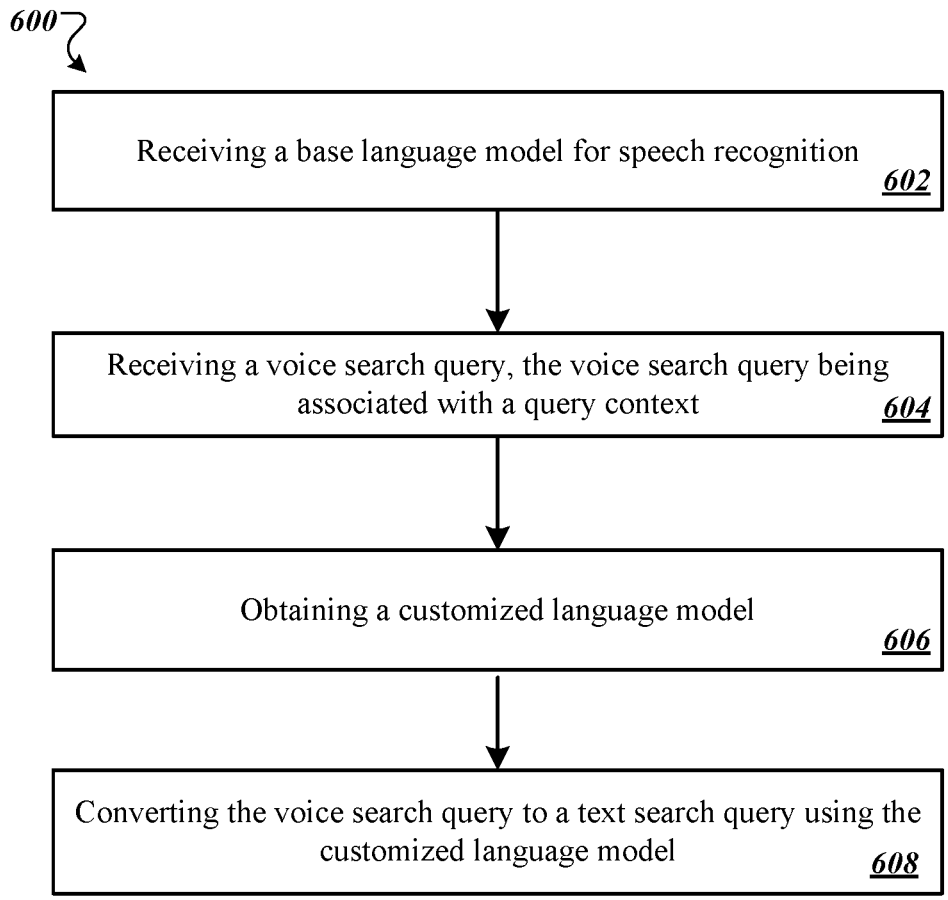
FIG. 6 is a flowchart of an example method for using a customized language model.

FIG. 6 is a flowchart of an example method 600 for using a customized language model. For convenience, the method will be described with respect to a system that performs the method 600, e.g., as described above. The system receives (602) a base language model for speech recognition. The base language model includes multiple word sequences, each word sequence being associated with a probability value. The word sequences can be represented as text string, compressed text strings, objects, or indices. The base language model can be generated from anonymous query logs of a collection of users.

The system receives (604) a voice search query. The voice search query is associated with a query context. The query context can include a geographic location of a user device from which the voice search query is received. The geographic location can be a point or a geographic area. The point or geographic area can be defined, for example, by one or more sets of latitude, longitude, or altitude coordinates. The query context can include, for example, a timestamp of the query, or a user identifier of a user providing the voice search query.

The system determines (605) that a customized language model is to be used when the query context satisfies one or more criteria associated with the customized language model. If the query context does not meet any criterion, the system can use the base language model to convert the voice search query to a text search query.

The system obtains (606) the customized language model. The customized language model includes one or more word sequences corresponding to an adjusted probability value. The adjusted probability value is the base probability value adjusted according to the query context, when the query context matches one or more adjustment criteria. Obtaining the customized language model can include at least one of: (1) selecting the customized language model from one or more pre-stored customized language models based on the query context, or (2) adjusting the base language model at query time based on the received query context using one or more language adjustment rules to generate the customized language model. The customized language model can be obtained as described above with respect to FIGS. 1-5

In some implementations, the query context includes a geographic location of a user device from which the voice search query is received. The system can identify one or more word sequences related to the geographic location. The adjusted probability value of a word sequence includes the base probability value adjusted based on a degree of relationship between the word sequence and the geographic location. For example, the word sequence can include a name of a feature (e.g., business, park, or street) located at or proximate to the geographic location of the user device. The degree of relationship can be determined based on a distance between the feature and the geographic location in the query context. The geographic location can be a geographic area defined by one or more sets of latitude, longitude, or altitude coordinates.

In some implementations, a word sequence includes a term of a past query received from the geographic location at a frequency that exceeds a threshold. The degree of relationship is determined based on the frequency. For example, if the system receives a sufficient number or percentage of queries including terms "climate best by government test" at a particular location, the system can increase a probability value for the word sequence "climate best by government test" in a customized language model associated with that particular location. In some implementations, the higher the number or percentage, the higher the increase the probability value.

In some implementations, the query context includes a user provided identifier (e.g., a user name or a user identifier) for associating with the voice search query. The system determines a social group associated with the user provided identifier. The social group can be a stored social network of a user. The social group can include one or more user identifiers that are related to the user provided identifier in the social network. The system determines a frequency of occurrence of the word sequence using stored query logs that are associated with the user identifiers in the social group, and adjusts the base probability value based on the frequency of occurrence. For example, the system can determine that a search query, either voice or text, that includes search terms "swim meet" occurs in a high frequency in a group relating to parenting. The system can create a customized language model in which the probability value for word sequence "swim meet" is higher than that in a base language model, and apply the customized language model to speech input by a user in the parenting group. The system can additionally or alternatively adjust the base probability value based on a degree of relationship in the social group.

In some implementations, the query context includes a timestamp of the voice search query. Obtaining the customized language model includes identifying one or more electronic documents (e.g., news articles). The electronic documents, each individually or as a collection, are associated with a number of search queries according to a query log. An electronic document can be associated with a query if it has been designated as a search result of the query by a search engine or selected as a destination from a list of search results by a user. The system identifies the electric documents that each includes one or more word sequences. If the associated search queries occur within a specified time window (e.g., a day or a week) from the timestamp, the system can increase the probability values associated with the one or more word sequences in a customized language model. For example, if, for a period of time, numerous education related news articles include a word sequence "tiger mom," the word sequence "tiger mom," which may be associated with a low probability value in a base language model, can be associated with a higher probability value in a customized language model.

The system converts (608) the voice search query to a text search query that includes the word sequence, based on the corresponding adjusted probability value in the customized language model. The system can provide (610) one or more search results of the text search query as a response to the voice search query for display on a display device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media for execution by, or to control the operation of, a data processing apparatus. Alternatively or in addition, the program instructions can be encoded on an artificially-generated propagated signal, e.g., a machine-generated electrical, optical, or electromagnetic signal, that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processing unit, a computer, a system on a chip, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processing units executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processing units suitable for the execution of a computer program include, by way of example, both general and special purpose microprocessors, and any one or more processing units of any kind of digital computer. Generally, a processing unit will receive instructions and data from a read-only memory or a random access memory or both. The essential elements of a computer are a processing unit for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, a network routing device, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processing unit and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or a routing device, e.g., a network router, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs executing on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

An electronic document (which for brevity will simply be referred to as a document) can, but need not, correspond to a file. A document can be stored in a portion of a file that holds other documents, in a single file dedicated to the document in question, or in multiple coordinated files.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous. Accordingly, other embodiments are within the scope of the following claims.

What is claimed is:

1. A method comprising:
   receiving a voice search query, the voice search query provided by a user to a user device;
   determining that a particular customized language model of a plurality of customized language models is to be used to recognize the voice search query, wherein each customized language model includes one or more adjusted probabilities for respective word sequences of the language model, wherein the probabilities are adjusted with respect to corresponding word sequence probabilities in a base language model;
   using the particular customized language model to generate a text search query from the voice search query; and
   providing for display on the user device, one or more search results responsive to the text search query.

2. The method of claim 1, wherein each customized language model is generated according one or more language adjustment rules for adjusting the respective probabilities of the base language model based on a particular geographic location.

3. The method of claim 1, wherein determining that the particular customized language model is to be used comprises determining that the query is received by a user device having a particular geographic location associated with the particular customized language model.

4. The method of claim 3, wherein adjusting a probability for the particular customized language model includes adjusting a probability of a particular word sequence based on a degree of relationship between the particular word sequence and a geographic location of the user device.

5. The method of claim 4, wherein:
   the particular word sequence includes a name of a feature located at or proximate to the geographic location; and
   the degree of relationship is determined based on a distance between the feature and the geographic location in the query context.

6. The method of claim 1, wherein the determining that the particular customized language model is to be used comprises determining one or more terms of the query and occurrences of the one or more terms by users sharing a social group with the user.

7. The method of claim 6, wherein adjusting a probability for the particular customized language model includes determining a frequency of occurrence of the word sequence using stored query logs that are associated with users of the social group and adjusting a probability of a particular word sequence based on the frequency.

8. The method of claim 1, wherein the determining that the particular customized language model is to be used comprises determining an association between the received query and one or more current events.

9. A system comprising:
   one or more computers and one or more storage devices storing instructions that are operable, when executed by the one or more computers, to cause the one or more computers to perform operations comprising:
   receiving a voice search query, the voice search query provided by a user to a user device;
   determining that a particular customized language model of a plurality of customized language models is to be used to recognize the voice search query, wherein each customized language model includes one or more adjusted probabilities for respective word sequences of the language model, wherein the probabilities are adjusted with respect to corresponding word sequence probabilities in a base language model;
   using the particular customized language model to generate a text search query from the voice search query; and
   providing for display on the user device, one or more search results responsive to the text search query.

10. The system of claim 9, wherein each customized language model is generated according one or more language adjustment rules for adjusting the respective probabilities of the base language model based on a particular geographic location.

11. The system of claim 9, wherein determining that the particular customized language model is to be used comprises determining that the query is received by a user device having a particular geographic location associated with the particular customized language model.

12. The system of claim 11, wherein adjusting a probability for the particular customized language model includes adjusting a probability of a particular word sequence based on a degree of relationship between the particular word sequence and a geographic location of the user device.

13. The system of claim 12, wherein:
   the particular word sequence includes a name of a feature located at or proximate to the geographic location; and
   the degree of relationship is determined based on a distance between the feature and the geographic location in the query context.

14. The system of claim 9, wherein the determining that the particular customized language model is to be used comprises determining one or more terms of the query and occurrences of the one or more terms by users sharing a social group with the user.

15. The system of claim 14, wherein adjusting a probability for the particular customized language model includes determining a frequency of occurrence of the word sequence using stored query logs that are associated with users of the social group and adjusting a probability of a particular word sequence based on the frequency.

16. The system of claim 9, wherein the determining that the particular customized language model is to be used comprises determining an association between the received query and one or more current events.

17. One or more non-transitory computer storage media encoded with a computer program, the program comprising instructions that are operable, when executed by data processing apparatus, to cause the data processing apparatus to perform operations comprising:
    receiving a voice search query, the voice search query provided by a user to a user device;
    determining that a particular customized language model of a plurality of customized language models is to be used to recognize the voice search query, wherein each customized language model includes one or more adjusted probabilities for respective word sequences of the language model, wherein the probabilities are adjusted with respect to corresponding word sequence probabilities in a base language model;
    using the particular customized language model to generate a text search query from the voice search query; and
    providing for display on the user device, one or more search results responsive to the text search query.

18. The one or more non-transitory computer storage media of claim 17, wherein each customized language model is generated according one or more language adjustment rules for adjusting the respective probabilities of the base language model based on a particular geographic location.

19. The one or more non-transitory computer storage media of claim 17, wherein determining that the particular customized language model is to be used comprises determining that the query is received by a user device having a particular geographic location associated with the particular customized language model.

20. The one or more non-transitory computer storage media of claim 19, wherein adjusting a probability for the particular customized language model includes adjusting a probability of a particular word sequence based on a degree of relationship between the particular word sequence and a geographic location of the user device.

21. The one or more non-transitory computer storage media of claim 20, wherein:
    the particular word sequence includes a name of a feature located at or proximate to the geographic location; and
    the degree of relationship is determined based on a distance between the feature and the geographic location in the query context.

22. The one or more non-transitory computer storage media of claim 17, wherein the determining that the particular customized language model is to be used comprises determining one or more terms of the query and occurrences of the one or more terms by users sharing a social group with the user.

23. The one or more non-transitory computer storage media of claim 22, wherein adjusting a probability for the particular customized language model includes determining a frequency of occurrence of the word sequence using stored query logs that are associated with users of the social group and adjusting a probability of a particular word sequence based on the frequency.

24. The one or more non-transitory computer storage media of claim 17, wherein the determining that the particular customized language model is to be used comprises determining an association between the received query and one or more current events.

\* \* \* \* \*